United States Patent
Cheng et al.

(10) Patent No.: US 9,929,045 B2
(45) Date of Patent: Mar. 27, 2018

(54) DEFECT INSPECTION AND REPAIRING METHOD AND ASSOCIATED SYSTEM AND NON-TRANSITORY COMPUTER READABLE MEDIUM

(71) Applicant: TAIWAN SEMICONDUCTOR MANUFACTURING COMPANY LTD., Hsinchu (TW)

(72) Inventors: Nai-Han Cheng, Hsinchu County (TW); Chi-Ming Yang, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 69 days.

(21) Appl. No.: 15/210,065

(22) Filed: Jul. 14, 2016

(65) Prior Publication Data

US 2018/0019166 A1 Jan. 18, 2018

(51) Int. Cl.

| | |
|---|---|
| G06F 17/50 | (2006.01) |
| G06F 19/00 | (2011.01) |
| G21K 5/10 | (2006.01) |
| G06K 9/00 | (2006.01) |
| H01L 21/00 | (2006.01) |
| H01L 21/768 | (2006.01) |
| H01L 21/66 | (2006.01) |
| H01L 25/00 | (2006.01) |
| H01L 21/67 | (2006.01) |

(52) U.S. Cl.
CPC .... *H01L 21/76894* (2013.01); *G06F 17/5004* (2013.01); *G21K 5/10* (2013.01); *H01L 21/67138* (2013.01); *H01L 21/67288* (2013.01); *H01L 22/22* (2013.01); *H01L 25/50* (2013.01); *G06F 19/00* (2013.01); *G06F 2217/12* (2013.01); *G06K 9/00* (2013.01)

(58) Field of Classification Search
CPC .. G06F 17/5004; G06F 19/00; G06F 2217/12; G21K 5/00; G21K 5/10; G06K 9/00; H01L 21/00
USPC ............... 716/54, 55; 382/145, 154, 149; 250/492.22, 492.23; 378/34, 35; 430/4, 430/5; 700/98, 109, 121; 438/795
See application file for complete search history.

(56) References Cited

U.S. PATENT DOCUMENTS

| | | | | |
|---|---|---|---|---|
| 3,958,078 A | * | 5/1976 | Fowler | G01N 23/043 348/127 |
| 5,224,137 A | * | 6/1993 | Plomgren | A61B 6/032 378/10 |

(Continued)

OTHER PUBLICATIONS

Amin et al., "Interface Development for Cost Effective Automated IC Orientation Checking Systems", IEEE, 2007, 6 pages.*

*Primary Examiner* — Phallaka Kik
(74) *Attorney, Agent, or Firm* — WPAT, P.C., Intellectual Property Attorneys; Anthony King (57) ABSTRACT

A defect inspection and repairing method is disclosed. The method includes: providing a wafer including a semiconductor chip disposed on a surface of the wafer; disposing a layer over the semiconductor chip; obtaining a scanned image of the disposed layer; performing an image analysis upon the scanned image to obtain a defect information; and generating a recipe of a beam according to the defect information, wherein the beam is configured to apply on the disposed layer. Associated system and non-transitory computer-readable medium are also disclosed.

20 Claims, 6 Drawing Sheets

(56) References Cited

U.S. PATENT DOCUMENTS

| | | | | |
|---|---|---|---|---|
| 6,753,947 | B2* | 6/2004 | Meisburger | G03F 7/70041 250/492.2 |
| 8,034,640 | B2* | 10/2011 | Shin | H01J 37/241 257/E21.53 |
| 2003/0226951 | A1* | 12/2003 | Ye | G03F 7/70591 250/208.1 |
| 2006/0000964 | A1* | 1/2006 | Ye | G03F 1/84 250/208.1 |
| 2006/0095208 | A1* | 5/2006 | Hirscher | B82Y 10/00 430/5 |
| 2009/0046923 | A1* | 2/2009 | Chang | G01N 21/952 382/152 |
| 2009/0271675 | A1* | 10/2009 | Dickson | G01R 31/311 714/732 |
| 2011/0057333 | A1* | 3/2011 | Di Giacomo | G03F 7/70483 257/797 |
| 2011/0133066 | A1* | 6/2011 | Nozoe | H01J 37/265 250/252.1 |
| 2013/0336574 | A1* | 12/2013 | Nasser-Ghodsi | G06T 7/001 382/145 |
| 2015/0054940 | A1* | 2/2015 | Shi | G06T 7/001 348/87 |
| 2015/0079500 | A1* | 3/2015 | Shih | G03F 1/80 430/5 |
| 2016/0012579 | A1* | 1/2016 | Shi | G06T 7/001 382/149 |
| 2016/0110858 | A1* | 4/2016 | Liu | G06T 7/41 382/149 |
| 2016/0313651 | A1* | 10/2016 | Middlebrooks | G03F 7/705 |
| 2017/0205359 | A1* | 7/2017 | Ilan | G01N 21/9505 |

* cited by examiner

DEFECT INSPECTION AND REPAIRING METHOD AND ASSOCIATED SYSTEM AND NON-TRANSITORY COMPUTER READABLE MEDIUM

BACKGROUND

Semiconductor devices are used in a variety of electronic applications, such as personal computers, cell phones, digital cameras, and other electronic equipment, as examples. In an attempt to further increase circuit density, two-dimensional (2D) or three-dimensional (3D) ICs have been investigated. Two or more dies are provided and electrical connections are formed between each die and contact pads on a substrate.

When manufacturing the electrical connections for the 2D or 3D ICs, a post passivation interconnect (PPI) layer including a wiring layer is formed. Formation of the wiring layer involves depositing metal layers through chemical vapor deposition and then etching the undesired portions. If defects occur and result in undesired patterns in the metal layers, the undesired patterns on the RDL can result in poor device performance, shorts or opens, and decreased device yields, depending on the type, location, and severity of the defect.

What are needed in the art are improved methods of detecting and managing defects of semiconductor devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may he used herein for ease of description to describe one element or feature's relationship to another elernent(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially elative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Figure 1:
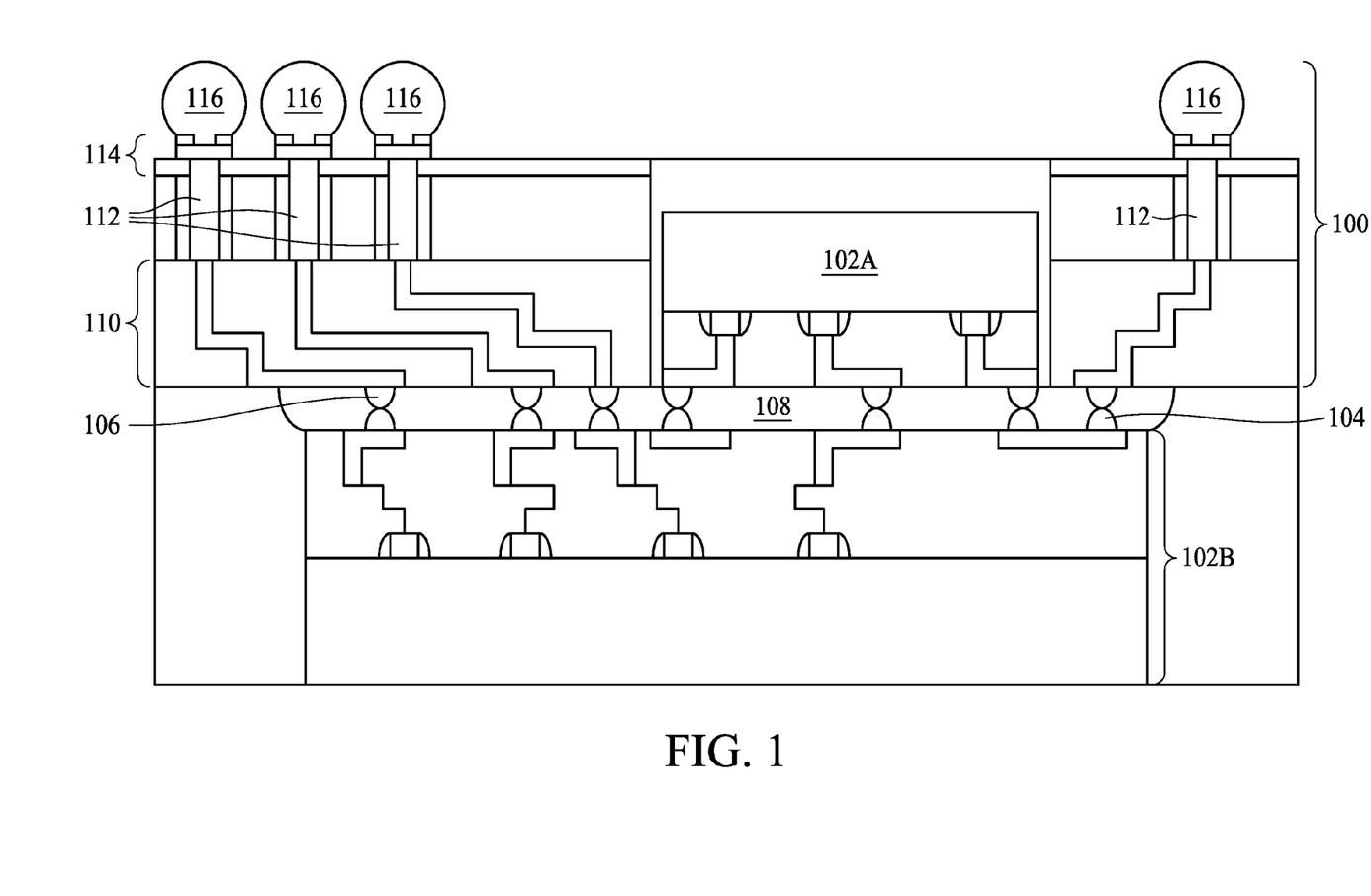
FIG. 1 is a cross-sectional view of a three-dimensional package including dies bonded to an interposer in accordance with an exemplary embodiment of the present disclosure.

FIG. 1 is a cross-sectional view of a three-dimensional package including dies bonded to an interposer in accordance with an exemplary embodiment of the present disclosure. Referring to FIG. 1, a stack-die structure including a first die 102A and a second die 102B is shown, wherein the first die 102A is bonded to the second die 102B. The first die 102A and the second die 102B may be device dies including integrated circuit devices, such as transistors (as schematically illustrated), capacitors, inductors, resistors, and the like, therein. The bonding between the first die 102A and the second die 102B may be a solder bonding or a metal-to-metal bonding.

Bond pads or humps 104 (referred to as bumps hereinafter) are on the surfaces of the second die 102B and facing the first die 102A. The first die 102A is bonded to center portion of the second die 102B, while edge portions of the second die 102B may be bonded to an interposer wafer 100. Again, depending on the type of front-side bumps 106, bumps 104 may be bond pads, solder bumps, or other non-reflowable metal bumps, such as copper bumps. Underfill 108 is filled into the gaps between the second die 102B and the first die 102A and the interposer wafer 100.

A post passivation interconnect (PPI) layer 110 includes one or more redistribution layers (RDLs), polymeric dielectric layers, wherein metal lines and vias are reside in the RDLs. Further, through-substrate vias (TSVs) 112 are electrically coupled to the PPI layer.

A backside interconnect structure 114 is formed to connect to TSVs 112. In some embodiments, backside interconnect structure 114 may include metal bumps and one or more PPI layers similar with the PPI layer 110. Backside metal bumps 116 are formed on the interconnect structure 114 and coupled to the TSVs 112.

The concept of the present disclosure relates to inspection and repairing of a post passivation interconnect (PPI) layer. Basically, the defect analysis result is derived by an inspection unit. The defect analysis result is in-situ transmitted to the repairing unit for metal line cutting and metal line redistribution in a feed forward manner. In particular, the metal line cutting and metal line redistribution functions is performed by employing a controller to automatically combine lasers from different laser sources having different wavelengths in accordance with different scenarios. Details regarding the novel defect inspection and repairing method will be described as follows.

Figure 2:
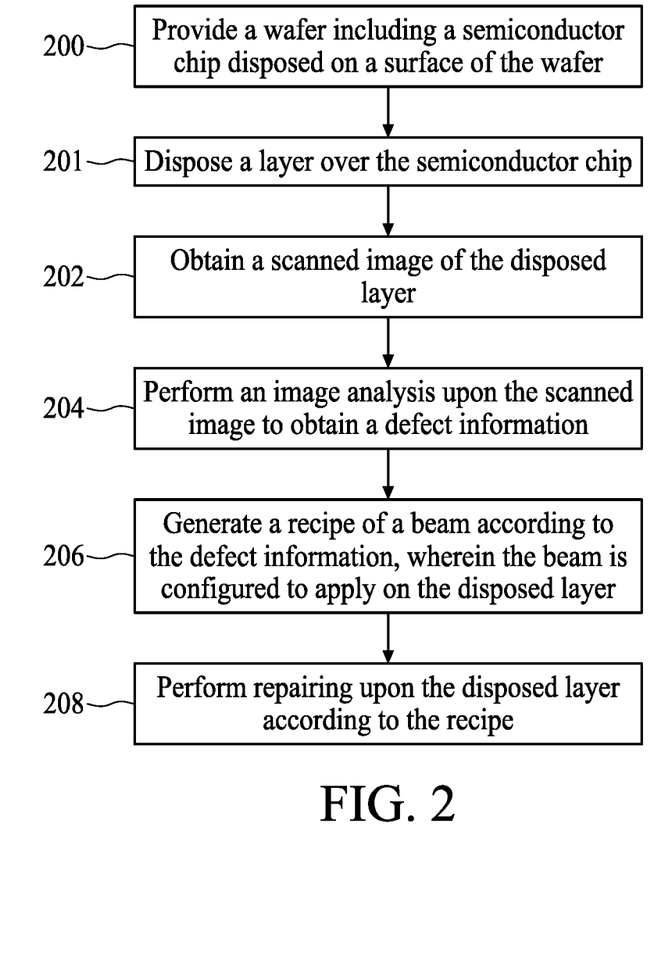
FIG. 2 is a flow chart of a novel novel defect inspection and repairing method in accordance with an exemplary embodiment of the present disclosure.

Referring to FIG. 2, FIG. 2 is a flow chart of a novel defect inspection and repairing method in accordance with an exemplary embodiment of the present disclosure. First, in step 200, a wafer including a semiconductor chip is provided. The semiconductor chip is disposed on a surface of the wafer. In step 201, a layer is disposed over the semiconductor chip. In the exemplary embodiment, the layer may be a PPI layer, and the PPI layer is electrically connected to the semiconductor chip. In some embodiments, the PPI layer is electrically connected to a conductive bump over the PPI layer. In some embodiments, the PPI layer includes a polymeric dielectric layer and conductive traces.

In step 202, at least a portion or all of the the disposed layer is scanned to obtain a digitized image. In the exemplary embodiment, the PPI layer is scanned. The image of the IPI layer may be obtained by capturing or extracting an image of a top surface of the PPI layer using an inspection tool adapted to capture high resolution images. In some embodiments, an image acquire system may be used to perform the inspection scan. The image may include raw data regarding the wafer under inspection. The scanned image may include a high resolution optical image of the surface of the wafer under inspection.

In some embodiments, the inspection scan system may include a defect review scanning system such as, for example, a scanning electron microscope (SEM), scatterometry analysis tool, an atomic force microscope (AFM), Aerial Image Measurement System (AIMS) from Carl Zeiss Microelectronics Systems (see U.S. Pat. No. 6,268,093, hereby incorporated by reference), DRC technique (see U.S. Pat. No. 6,373,975, hereby incorporated by reference), KLA-Tencor tools, Numerical Technologies, Inc. tools, and/or other systems operate to provide an aerial image of a substrate and its design pattern for example, based on an illumination value. However, this is not a limitation of the present disclosure.

In step 204, an image analysis is performed upon the scanned image to obtain a defect information. The scanned image is analyzed by using an automatic defect classification (ADC) method which utilizes predetermined defect classification rules to classify or categorize defects on the scanned image obtained by step 202, if defects are found. The ADC method is a portion of the analysis of the scanned image in accordance with some embodiments of the present disclosure. The ADC method is also referred to herein as an ADC algorithm. However, this is not a limitation of the present disclosure. In some embodiments, the scanned image may be also analyzed by using other algorithms simultaneously with the ADC algorithm, or before or after the ADC algorithm, for example.

in some embodiments, raw defect transmittance and reflective data (e.g., of the scanned image) may be checked by using the ADC algorithm. The ADC algorithm is adapted to classify defects found on the scanned image of the wafer, based on an analysis of the scanned image. The ADC algorithm may also function as a classification and nuisance/false defect filter based on inspection of the high resolution image in some embodiments, for example.

in particular, upon initializing the novel defect inspection and repairing method described herein, defect classification rules are entered as data to the ADC algorithm. The defect classification rules are established based on transmittance and reflective difference image and defect position in a pattern region, a dummy region, and/or a blank area on the wafer, as examples. Defects may not be a problem if they are located in a dummy region or blank area, for example. In some embodiments, the defects may be classified using a defect table and labeled using a classification code, such as "1A, 1B, 1C, 2A, 2B, 2C, 3A, 3B, 3C, 4A, 4B, 4C, 4D," etc. according to category, severity, and other parameters. Other types of classification codes may alternatively be use.

After the scanned image is obtained using step 202 of FIG. 2, the scanned image is input into the ADC algorithm. In step 204, the position of defects may be further determined by coordinates in a grid based on distances away from edges of the scanned image and then categorized further regarding type, location/topology, and severity in some embodiments, for example. The position, type, location/topology, and severity of defects are generally referred as defect information herein.

In step 206, a recipe of a beam is generated in accordance with the defect information. For example, the beam is a laser beam. However, this is not a limitation of the present disclosure. In some embodiments, the beam may be an ion beam. The beam is configured to apply on the disposed layer. In the exemplary embodiment, the laser beam is employed to apply on the PPI layer in order to isolate at least two bridged conductive traces or to connect at least two isolated conductive traces. For example, laser beam may be used for metal line cutting or metal line redistribution.

A controller may be employed to automatically perform laser beam combining in accordance with several major types of defects obtained from the defect inform. The goal is to combine two or more laser beams having different wavelengths and different intensity levels so as to obtain a single beam with a characteristic suitable for a specific material required to be applied on the disposed layer. To put it more specific, different materials may have different absorption coefficients. In general, the amount an incident radiation absorbed by the material depends on the frequency (wavelength) of the incident radiation. In addition, different defects may need different laser intensity levels. Therefore, using a laser beam recipe having a specific range of frequencies and intensity level dedicated for a certain type of defect is able to improve the successful rate for PPI layer repairing.

For example, a laser beam recipe may include an ablation recipe suitable for removal and cutting a portion of undesired metal (e.g. Cu) lines in the PPI layer. In some embodiments, a laser beam recipe may include an ablation recipe suitable for removal a portion of undesired polymeric dielectric layer in the PPI layer. In some embodiments, a laser beam recipe may include an ablation recipe suitable for removal a portion of undesired oxides in the PPI layer. In some embodiments, a laser beam recipe may include an ablation recipe suitable to clean undesired debris. In some embodiments, a laser beam recipe may include an ablation recipe suitable for heating conductive dry powder so as to perform metal line redistribution. In step 208, the repairing is performed. In the exemplary embodiment, the repairing may be performed by a repairing tool based on the recipe produced in step 206.

Figure 3:
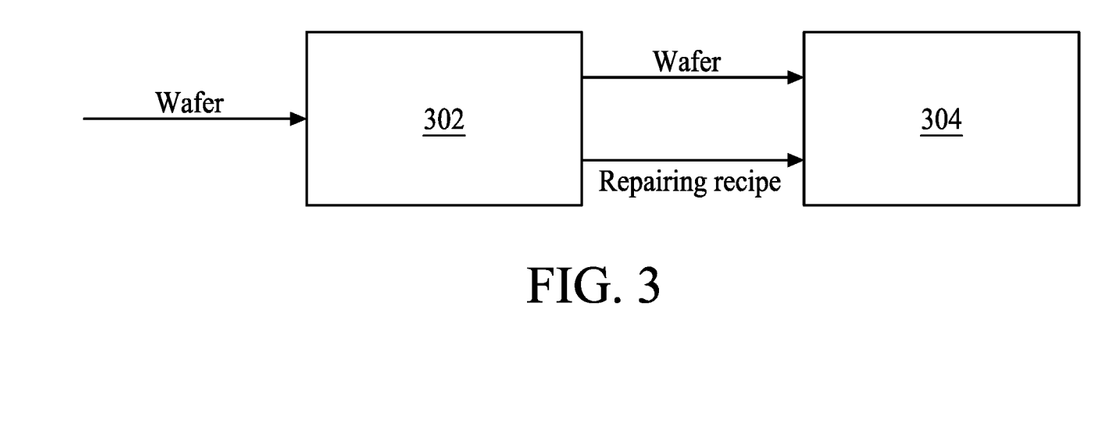
FIG. 3 is a diagram illustrating a defect inspection and repairing system in accordance with an exemplary embodiment of the present disclosure.

FIG. 3 is a diagram illustrating a defect inspection and repairing system in accordance with an exemplary embodiment of the present disclosure. In this embodiment, an inspection unit 302 is used to perform inspection upon a received wafer. In some embodiments, the wafer may housed in a closed container such as a front opening unified pod (FOUP) and transported by an overhead transport service. At one such location, the FOUP may be placed in a load port that interfaces with a processing tool. The inspection unit 302 may perform operations described with respect to step 200 to step 206 in FIG. 2. The inspection unit 302 may produce a repairing recipe to a downstream repairing unit 304 and transmit the wafer to the repairing unit 304 as well. The repairing unit 304 is coupled to the inspection unit 302 and may perform an operation described with respect to step 208 in FIG. 2.

Figure 4:
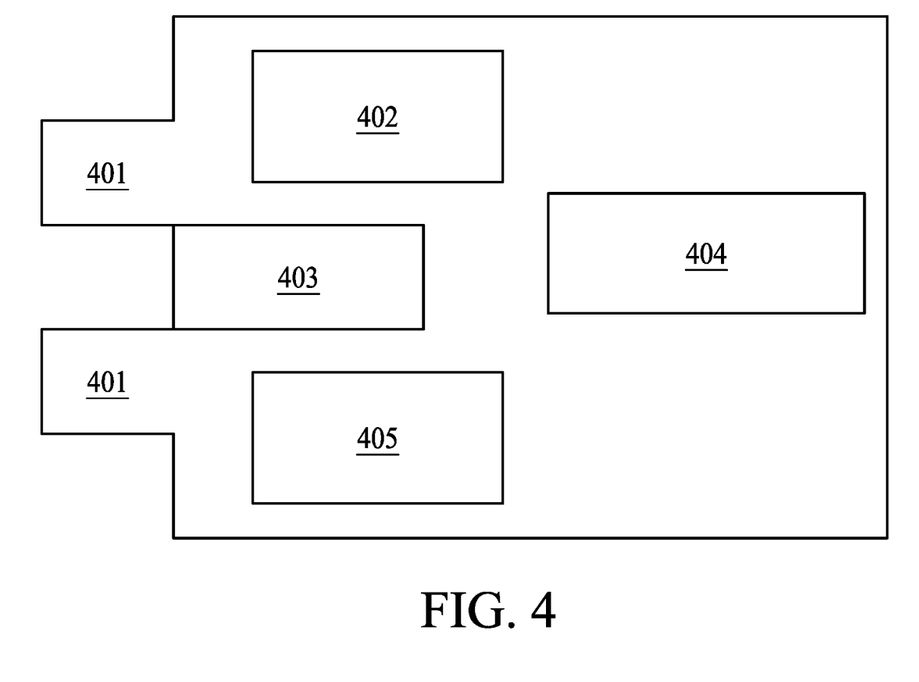
FIG. 4 is a diagram illustrating a defect inspection and repairing system in accordance with another embodiment of the present disclosure.

FIG. 4 is a diagram illustrating a defect inspection and repairing system in accordance with another embodiment of the present disclosure. In this embodiment, an inspection module 402 is used to perform inspection upon a wafer received from load ports 401 and transported by a transport service 403. The inspection unit 402 may perform operations described with respect to step 200 to step 206 in FIG. 2. The inspection unit 402 may produce a repairing recipe to a downstream laser/E-beam module 404 or a metal line distribute module 405 according to a class of defect types. The wafer is correspondingly transmitted to the downstream laser/E-beam module 404 or the metal line distribute module 405 by the transport service 403. The laser/E-beam module 404 may be used to isolate at least two bridged conductive traces on a PPI layer of the wafer. In contrast, the metal line distribute module 405 may be used to connect at least two isolated conductive traces on a PPI layer of the wafer.

Figure 5:
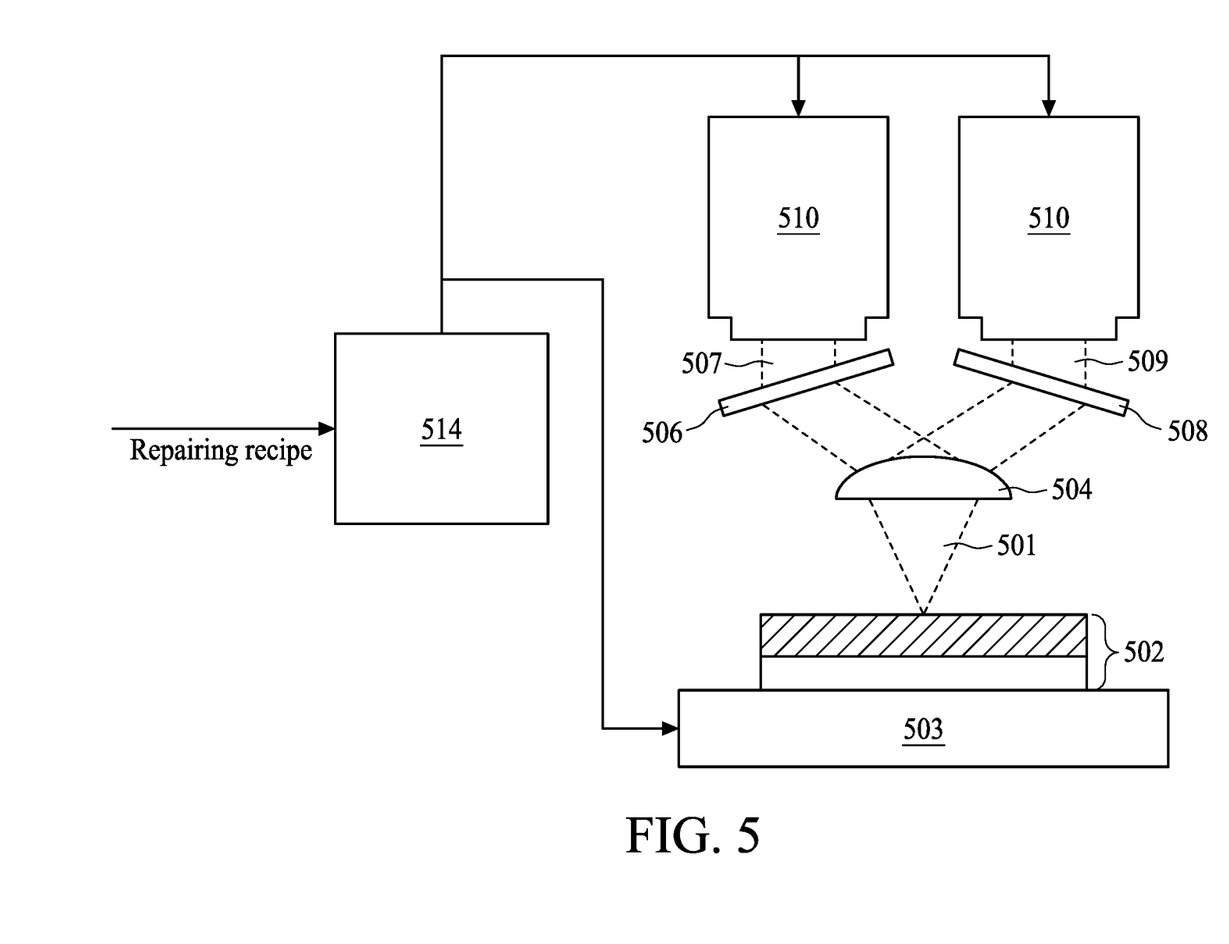
FIG. 5 is a diagram illustrating details of a repairing unit in accordance with an exemplary embodiment of the present disclosure.

FIG. 5 is a diagram illustrating details of the repairing unit 304 in accordance with an exemplary embodiment of the present disclosure. A wafer 502 is mounted on a stage 503. in the exemplary embodiment, the wafer 502 may include a semiconductor chip disposed on a surface of the wafer. A PPI layer is disposed over the semiconductor chip. However, this is not a limitation of the present disclosure. The stage 503 is located below the projection lens of the repairing unit 304. A first laser beam 507 from a first laser source 510 is directed by a first folding mirror 506 to lens 504. A second laser beam 509 from a second laser source 512 is directed by a second folding mirror 508 to lens 504. The first and second directed laser beams are therefore together focused by lens 504 to produce afocused laser beam 501 onto the wafer 502.

The frequency of first laser beam 507 and the frequency of second laser beam 509 may be different. In some embodiments, there may be more than two laser sources in the repairing unit 304. The intensity level and the selection of the laser sources to synthesize the focused laser beam 501 may be determined by a controller 514 coupled to the first laser source 510 and the second laser source 512. In this embodiment, the controller 514 is configured to control the first laser source 510 and the second laser source 512 according to a repairing recipe received from the inspection unit 302 shown in FIG. 3. In some embodiment, the stage 503 is an X-Y stage, and the controller 514 is coupled to the X-Y stage 503 for horizontally or vertically moving the X-Y stage 503 until a focal spot overlaps a defect hotspot. Please note that in some embodiments, the apparatus shown in FIG. 5 may be employed in the laser/E-beam module 404 and the metal line distribute module 405 of FIG. 4 as well.

Figure 6:
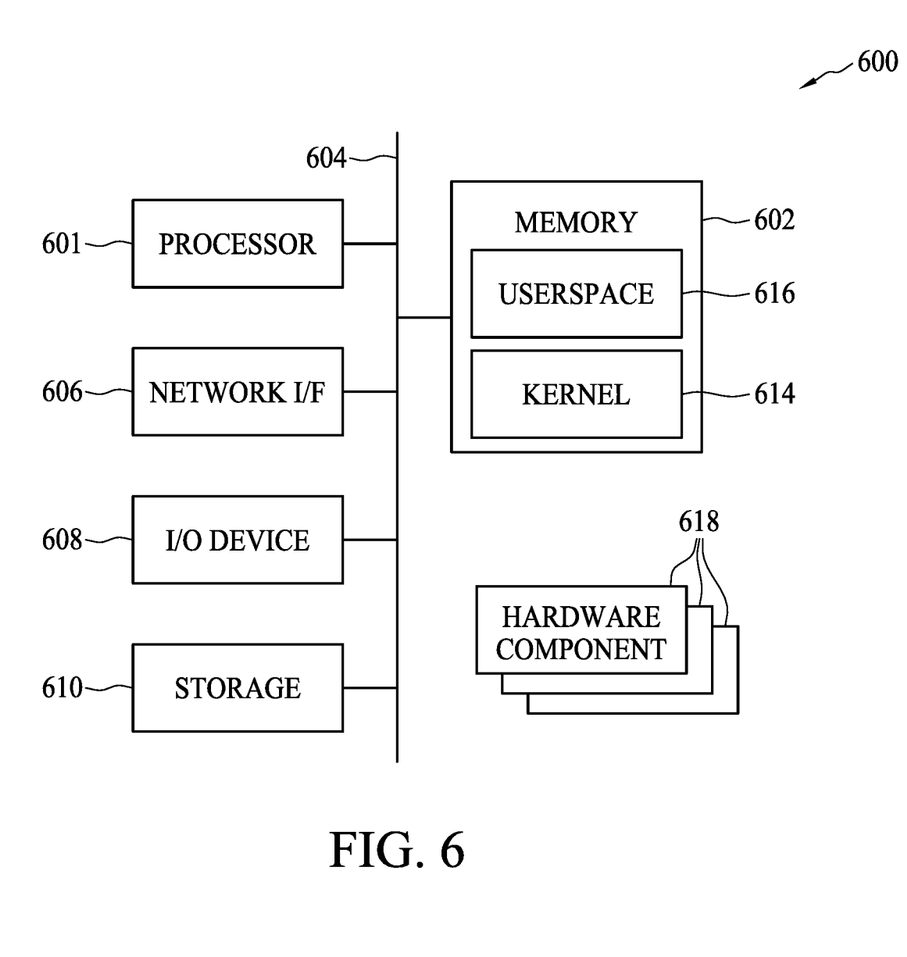
FIG. 6 is a block diagram of a computer system in accordance with an exemplary embodiment of the present disclosure.

FIG. 6 is a block diagram of a computer system 600 in accordance with an exemplary embodiment of the present disclosure. One or more of the tools and/or systems and/or operations described with respect to FIGS. 1 and 5 may be realized in some embodiments by one or more computer systems 600 of FIG. 6. The system 600 may include a processor 601, a memory 602, a network interface (I/F) 606, a storage 610, an input/output (I/O) device 608, and one or more hardware components 618 communicatively coupled via a bus 604 or other interconnection communication mechanism.

The memory 602 may include, in some embodiments, a random access memory (RAM) and/or other dynamic storage device and/or read only memory (ROM) and/or other static storage device, coupled to the bus 604 for storing data and/or instructions to be executed by the processor 601, e.g, kernel 614, user space 616, portions of the kernel and/or the user space, and components thereof. The memory 602 is also used, in some embodiments, for storing temporary variables or other intermediate information during execution of instructions to be executed by the processor 601.

In some embodiments, a storage device 610, such as a magnetic disk or optical disk, is coupled to the bus 604 for storing data and/or instructions, e.g., kernel 614, user space 616, etc. The I/O device 608 may include an input device, an output device and/or a combined input/output device for enabling user interaction with the system 600. An input device may include, for example, a keyboard, keypad, mouse, trackball, trackpad, and/or cursor direction keys for communicating information and commands to the processor 601. An output device may include, for example, a display, a printer, a voice synthesizer, etc. for communicating information to a user.

In some embodiments, one or more operations and/or functionality of the tools and/or systems described with respect to FIGS. 1 and 5 may be realized by the processor 601, which is programmed for performing such operations and/or functionality. One or more of the memory 602, the I/F 606, the storage 310, the I/O device 608, the hardware components 618, and the bus 604 is/are operable to receive instructions, data, design rules, netlists, layouts, models and/or other parameters for processing by the processor 601.

In some embodiments, one or more of the operations and/or functionality of the tools and/or systems described with respect to FIGS. 1 and 5 may be implemented by specifically configured hardware (e.g., by one or more application specific integrated circuits or ASIC(s)) which is/are included) separate from or in lieu of the processor 601. Some embodiments incorporate more than one of the described operations and/or functionality in a single ASIC.

In some embodiments, the operations and/or functionality may be realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The above methods include exemplary operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within scope of the disclosure and will be apparent to those skilled in the art after reviewing this disclosure.

The novel defect inspection and repairing method and associated system and non-transitory computer readable medium is advantageously automatic. After an image is taken using an inspection unit and defect information is produced, the inspection unit in-situ generates a repairing recipe of a laser beam for cutting or re-distribution according to the defect information. A repairing unit can automatically repair defects of PPI layers in a wafer based on the repairing recipe, so that human error is avoided and the time taken to repair the defects is decreased. Thus the yield loss when producing 2D or 3D IC can be significantly mitigated thereby reducing cost.

Some embodiments of the present disclosure provide a defect inspection and repairing method, including: providing a wafer including a semiconductor chip disposed on a surface of the wafer; disposing a layer over the semiconductor chip; obtaining a scanned image of the disposed layer; performing an image analysis upon the scanned image to obtain a defect information; and generating a recipe of a beam according to the defect information, wherein the beam is configured to apply on the disposed layer.

Some embodiments of the present disclosure provide a defect inspection and repairing system for a wafer, wherein the wafer includes a semiconductor chip disposed thereon, and the semiconductor chip includes a layer disposed thereon, the system including: an inspection unit, used for obtaining a scanned image of the disposed layer, performing an image analysis upon the scanned image to obtain a defect information; and generating a recipe of a beam according to the defect information, wherein the beam is configured to apply on the disposed layer; and a repairing unit, used for generating the beam to isolate at least two bridged conductive traces or connect at least two isolated conductive traces.

Some embodiments of the present disclosure provide a non-transitory computer-readable medium containing therein instructions which, when executed by a computer, cause the computer to perform the actions including: obtaining a scanned image of a layer disposed on a semiconductor chip, wherein the semiconductor chip is disposed on a wafer; performing an image analysis upon the scanned image to obtain a defect information; and generating a recipe of a beam according to the defect information, wherein the beam is configured to apply on the disposed layer.

The foregoing outlines features of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A defect inspection and repairing method, comprising:
    providing a wafer including a semiconductor chip disposed on a surface of the wafer;
    disposing a layer over the semiconductor chip;
    obtaining a scanned image of the disposed layer;
    performing an image analysis upon the scanned image to obtain a defect information; and
    generating a recipe of a beam according to the defect information, wherein the beam is configured to apply on the disposed layer.

2. The method of claim 1, further comprising isolating at least two bridged conductive traces.

3. The method of claim 1, further comprising connecting at least two isolated conductive traces.

4. The method of claim 1, wherein the disposed layer includes a post passivation interconnect (PPI).

5. The method of claim 4, wherein the PPI is electrically connected to the semiconductor chip.

6. The method of claim 4, wherein the PPI is electrically connected to a conductive bump over the PPI.

7. The method of claim 1, wherein the disposed layer includes a polymeric dielectric.

8. The method of claim 1, wherein the generation of the recipe of the beam according to the defect information comprises:
    selecting laser sources with different wavelengths used to form the beam according to a material corresponding to the disposed layer.

9. The method of claim 1, wherein the generation of the recipe of the beam according to the defect information comprises:
    adjusting intensity levels of laser sources used to form the beam according to a material corresponding to the disposed layer.

10. A defect inspection and repairing system for a wafer, wherein the wafer includes a semiconductor chip disposed thereon, and the semiconductor chip includes a layer disposed thereon, the system comprising:
    an inspection unit, used for obtaining a scanned image of the disposed layer, performing an image analysis upon the scanned image to obtain a defect information; and generating a recipe of a beam according to the defect information, wherein the beam is configured to apply on the disposed layer; and
    a repairing unit, used for generating the beam to isolate at least two bridged conductive traces or connect at least two isolated conductive traces.

11. The system of claim 10, wherein the repairing unit comprises:

a first laser source, used to generate a first laser beam;

a second laser source, used to generate a second laser beam; and a controller, coupled to the first laser source and the second laser source;

wherein the controller is used to adjust an intensity level of the first laser beam and the second laser beam respectively.

12. The system of claim 10, wherein the repairing unit further comprises:

a lens;

a first folding mirror, used to direct the first laser beam to the lens; and a second folding mirror, used to direct the second laser beam to the lens;

wherein the first and second directed laser beams are together focused by the lens to produce the beam onto the wafer.

13. A non-transitory computer-readable medium containing therein instructions which, when executed by a computer, cause the computer to perform the actions comprising:

obtaining a scanned image of a layer disposed on a semiconductor chip, wherein the semiconductor chip is disposed on a wafer;

performing an image analysis upon the scanned image to obtain a defect information; and generating a recipe of a beam according to the defect information, wherein the beam is configured to apply on the disposed layer.

14. The non-transitory computer-readable medium of claim 13, wherein the actions further comprise:

isolating at least two bridged conductive traces.

15. The non-transitory computer-readable medium of claim 13, wherein the actions further comprise:

connecting at least two isolated conductive traces.

16. The non-transitory computer-readable medium of claim 13, wherein the disposed layer includes a post passivation interconnect (PPI).

17. The non-transitory computer-readable medium of claim 16, wherein the PPI is electrically connected to a conductive bump over the PPI.

18. The non-transitory computer-readable medium of claim 13, wherein the disposed layer includes a polymeric dielectric.

19. The non-transitory computer-readable medium of claim 13, wherein the generation of the recipe of the beam according to the defect information comprises:

selecting laser sources with different wavelengths used to form the beam according to a material corresponding to the disposed layer.

20. The non-transitory computer-readable medium of claim 13, wherein the generation of the recipe of the beam according to the defect information comprises:

adjusting intensity levels of laser sources used to form the beam according to a material with respect to defects desired to repair.

* * * * *